(12) United States Patent
Campbell et al.

(10) Patent No.: US 7,350,821 B2
(45) Date of Patent: Apr. 1, 2008

(54) METHOD AND SYSTEM FOR PURGING A DISPENSED FLUID WITHIN A FLUID DISPENSING SYSTEM INCLUDING A FILTER-FREE CONNECTOR APPARATUS

(75) Inventors: Jeffrey M. Campbell, Foxboro, MA (US); J. Karl Niermeyer, Tyngsboro, MA (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/079,360

(22) Filed: Feb. 20, 2002

(65) Prior Publication Data

US 2002/0079695 A1 Jun. 27, 2002

Related U.S. Application Data

(60) Division of application No. 09/113,837, filed on Jul. 10, 1998, now Pat. No. 6,378,907, which is a continuation-in-part of application No. 08/678,795, filed on Jul. 12, 1996, now Pat. No. 6,068,770.

(51) Int. Cl.
*B61G 5/08* (2006.01)
*B01D 63/00* (2006.01)
*B01D 35/00* (2006.01)
*B01D 61/00* (2006.01)

(52) U.S. Cl. .................. 285/26; 210/257.2; 210/232; 210/456

(58) Field of Classification Search ........... 210/636, 210/321.6, 321.75, 321.8, 456, 440, 446, 210/443, 445, 321.69, 441, 195.2, 416.1, 210/134, 767, 257.2, 195.1, 232; 134/109, 134/94.1, 24.4, 22.12, 10, 92, 42, 168 C, 134/19, 21, 22; 222/1; 285/26, 124.1; 220/749, 220/257.2, 257.1, 105.2; 417/26; 137/109–115
See application file for complete search history.

(56) References Cited

U.S. PATENT DOCUMENTS

| 136,631 A | 3/1873 | Westinghouse |
| 420,209 A | 1/1890 | Nilson |
| 468,390 A | 2/1892 | Westerman |

(Continued)

FOREIGN PATENT DOCUMENTS

DE 22 16 228 10/1972

(Continued)

OTHER PUBLICATIONS

*Mykrolis Corporation* v. *Pall Corporation*, United States District Court, District of Massachusetts (Boston) Civil Docket # 1:03-cv-10392-GAO, pp. 1-11.

(Continued)

*Primary Examiner*—Ana Fortuna
(74) *Attorney, Agent, or Firm*—Hamilton, Brook, Smith & Reynolds, P.C.

(57) ABSTRACT

A connector apparatus is provided which is configured to replace a separation module in a system for dispensing a fluid. When it is desired to purge the system of a dispensed fluid, the connector apparatus, having the same configuration of an inlet and an outlet as the separation module, replaces the separation module and a purging fluid is passed through the system.

16 Claims, 6 Drawing Sheets

U.S. PATENT DOCUMENTS

| | | | |
|---|---|---|---|
| 872,174 A | 11/1907 | Fyock et al. |
| 872,707 A | 12/1907 | Beahm |
| 891,718 A | 6/1908 | McMillan |
| 898,214 A | 9/1908 | Gold |
| 940,334 A | 11/1909 | Leftwich |
| 967,516 A | 8/1910 | Harrison |
| 1,070,110 A | 8/1913 | Brown |
| 1,186,068 A | 6/1916 | Benjamin |
| 1,221,682 A | 4/1917 | Coffield |
| 1,389,012 A | 8/1921 | Roberts |
| 1,786,066 A | 12/1930 | Hermann |
| 1,791,046 A | 2/1931 | Sweetland |
| 1,886,398 A | 11/1932 | Harrell |
| 2,462,488 A | 2/1949 | Gunn |
| 2,630,919 A | 3/1953 | Tyler |
| 2,997,180 A | 8/1961 | Loveday |
| 3,052,863 A | 9/1962 | Uberbacher et al. |
| 3,107,601 A | 10/1963 | Longmire |
| 3,214,195 A | 10/1965 | Zahuranec et al. |
| 3,399,776 A | 9/1968 | Knuth |
| 3,469,863 A | 9/1969 | Riester et al. |
| 3,485,516 A | 12/1969 | Keller et al. |
| 3,493,115 A | 2/1970 | Koches |
| 3,504,803 A | 4/1970 | Brayman |
| 3,519,133 A | 7/1970 | Broering |
| 3,560,377 A | 2/1971 | Loeffler |
| 3,591,004 A | 7/1971 | Roosa |
| 3,628,662 A | 12/1971 | Kudlaty |
| 3,684,100 A | 8/1972 | Close |
| 3,695,446 A | 10/1972 | Lyall et al. |
| 3,706,184 A | 12/1972 | Tucker |
| 3,727,764 A | 4/1973 | Ogden |
| 3,734,851 A | 5/1973 | Matsumara |
| 3,802,564 A | 4/1974 | Turman |
| 3,812,659 A | 5/1974 | Westgren et al. |
| 3,935,106 A | 1/1976 | Lipner |
| 3,947,080 A | 3/1976 | Ege |
| 3,950,251 A | 4/1976 | Hiller |
| 4,075,099 A | 2/1978 | Pelton et al. |
| 4,089,549 A | 5/1978 | Vyse et al. |
| 4,151,823 A | 5/1979 | Grosse et al. |
| 4,174,231 A | 11/1979 | Hobgood |
| 4,269,219 A * | 5/1981 | Dybvig ........................ 137/322 |
| 4,283,284 A * | 8/1981 | Schnell .................... 210/321.8 |
| 4,298,358 A | 11/1981 | Ruschke |
| 4,321,911 A | 3/1982 | Offutt |
| 4,344,777 A | 8/1982 | Siposs |
| 4,404,103 A | 9/1983 | Drath |
| 4,411,783 A | 10/1983 | Dickens et al. |
| 4,416,775 A | 11/1983 | Halbich et al. |
| 4,435,287 A | 3/1984 | Sumimoto |
| 4,452,695 A | 6/1984 | Schmidt |
| 4,452,697 A | 6/1984 | Conrad |
| 4,494,775 A * | 1/1985 | Nash et al. .................... 285/26 |
| 4,498,989 A | 2/1985 | Miyakawa et al. |
| 4,500,426 A | 2/1985 | Ishii et al. |
| 4,507,203 A | 3/1985 | Johnston |
| 4,522,717 A | 6/1985 | Brust |
| 4,524,807 A | 6/1985 | Toliusis |
| 4,529,512 A | 7/1985 | Williamson et al. |
| 4,535,997 A | 8/1985 | Brust |
| 4,555,130 A * | 11/1985 | McClain ...................... 285/26 |
| 4,559,136 A * | 12/1985 | Dockery .................... 210/169 |
| 4,568,456 A | 2/1986 | van Zon |
| 4,610,781 A | 9/1986 | Bilstad et al. |
| 4,629,563 A | 12/1986 | Wrasidlo |
| 4,636,307 A | 1/1987 | Inoue et al. |
| 4,642,183 A | 2/1987 | Hebert |
| 4,654,142 A | 3/1987 | Thomsen et al. |
| 4,664,420 A | 5/1987 | Demeri |
| 4,678,577 A | 7/1987 | Thomas et al. |
| 4,698,154 A | 10/1987 | Mohn et al. |
| 4,719,012 A | 1/1988 | Groezinger et al. |
| 4,735,716 A | 4/1988 | Petrucci et al. |
| 4,759,571 A | 7/1988 | Stone et al. |
| 4,806,240 A | 2/1989 | Giordano et al. |
| 4,820,174 A | 4/1989 | Farrar et al. |
| 4,846,800 A | 7/1989 | Ouriel et al. |
| 4,857,189 A | 8/1989 | Thomsen et al. |
| 4,857,191 A | 8/1989 | Wolf |
| 4,861,476 A | 8/1989 | Kohlheb et al. |
| 4,870,961 A | 10/1989 | Barnard |
| 4,879,032 A | 11/1989 | Zemlin |
| 4,900,065 A * | 2/1990 | Houck .......................... 285/73 |
| 4,900,449 A | 2/1990 | Kraus et al. |
| 4,904,382 A | 2/1990 | Thomsen |
| 4,932,987 A | 6/1990 | Molina |
| 4,944,776 A | 7/1990 | Keyser et al. |
| 4,964,984 A | 10/1990 | Reeder et al. |
| 4,966,699 A | 10/1990 | Sasaki et al. |
| 5,022,986 A | 6/1991 | Lang |
| 5,041,220 A | 8/1991 | Lee et al. |
| 5,057,131 A | 10/1991 | Lackner et al. |
| 5,066,391 A | 11/1991 | Faria |
| 5,069,780 A | 12/1991 | Thalmann et al. |
| 5,076,925 A | 12/1991 | Roesink et al. |
| 5,085,772 A | 2/1992 | Busch-Sorensen |
| 5,096,230 A | 3/1992 | Bausch et al. |
| 5,108,598 A | 4/1992 | Posner |
| 5,125,691 A | 6/1992 | Bogdan |
| 5,133,858 A * | 7/1992 | Walz et al. .................. 210/136 |
| 5,139,668 A | 8/1992 | Pan et al. |
| 5,139,669 A | 8/1992 | Clermont et al. |
| RE34,050 E | 9/1992 | Thomsen et al. |
| 5,143,575 A | 9/1992 | Glässel et al. |
| 5,160,615 A | 11/1992 | Takagi et al. |
| 5,167,814 A | 12/1992 | Pulek |
| 5,167,837 A | 12/1992 | Snodgrass et al. |
| 5,172,998 A | 12/1992 | Hatagishi |
| 5,178,758 A | 1/1993 | Hwang |
| 5,180,490 A | 1/1993 | Eihusen et al. |
| 5,192,499 A | 3/1993 | Sakai et al. |
| 5,221,473 A | 6/1993 | Burrows |
| 5,230,760 A | 7/1993 | Tanabe |
| 5,230,812 A | 7/1993 | Williams |
| 5,262,068 A * | 11/1993 | Bowers et al. ............... 210/767 |
| 5,262,069 A | 11/1993 | Kato |
| 5,266,195 A | 11/1993 | Hopkins |
| 5,302,284 A | 4/1994 | Zeiner et al. |
| 5,316,347 A | 5/1994 | Arosio |
| 5,320,752 A | 6/1994 | Clack et al. |
| 5,324,483 A | 6/1994 | Cody et al. |
| 5,341,832 A | 8/1994 | Foust |
| 5,342,518 A | 8/1994 | Posner et al. |
| 5,344,194 A | 9/1994 | Hatagishi et al. |
| 5,354,464 A | 10/1994 | Slovak et al. |
| 5,373,595 A | 12/1994 | Johnson et al. |
| 5,380,437 A | 1/1995 | Bertoncini |
| 5,382,355 A | 1/1995 | Arlozynski |
| 5,383,690 A | 1/1995 | Niermeyer et al. |
| 5,387,339 A | 2/1995 | Lee et al. |
| 5,389,260 A | 2/1995 | Hemp et al. |
| 5,397,462 A | 3/1995 | Higashijima et al. |
| 5,397,468 A | 3/1995 | Chomka et al. |
| 5,399,263 A | 3/1995 | Chomka et al. |
| 5,401,401 A | 3/1995 | Hickok et al. |
| 5,413,711 A | 5/1995 | Janik |
| 5,417,459 A | 5/1995 | Gray et al. |
| 5,435,915 A | 7/1995 | Connors, Jr. |
| 5,437,483 A | 8/1995 | Umezawa |
| 5,449,454 A | 9/1995 | Hickok |
| 5,453,184 A | 9/1995 | Handtmann |
| 5,462,675 A | 10/1995 | Hopkins et al. |
| 5,468,388 A * | 11/1995 | Goddard et al. ....... 210/321.75 |

| | | |
|---|---|---|
| 5,468,390 A | 11/1995 | Crivello et al. |
| 5,474,683 A | 12/1995 | Bryant et al. |
| 5,478,119 A | 12/1995 | Dye |
| 5,486,288 A | 1/1996 | Stanford et al. |
| 5,505,842 A | 4/1996 | Enderle |
| 5,507,530 A | 4/1996 | Mahaney |
| 5,516,429 A | 5/1996 | Snodgrass et al. |
| 5,525,225 A | 6/1996 | Janik et al. |
| 5,558,371 A | 9/1996 | Lordo |
| 5,601,710 A | 2/1997 | Yoon et al. |
| 5,605,624 A | 2/1997 | Wright |
| 5,607,582 A | 3/1997 | Yamazaki et al. |
| 5,620,599 A | 4/1997 | Hopkins et al. |
| 5,632,894 A | 5/1997 | White et al. |
| 5,651,887 A | 7/1997 | Posner et al. |
| 5,653,871 A | 8/1997 | Thomsen |
| 5,667,679 A | 9/1997 | Bozenmayer et al. |
| 5,700,371 A | 12/1997 | Koslow |
| 5,702,597 A * | 12/1997 | Chevallet et al. ......... 210/195.2 |
| 5,725,623 A | 3/1998 | Bowerman et al. |
| 5,744,047 A * | 4/1998 | Gsell et al. ................. 210/767 |
| 5,762,787 A | 6/1998 | Park et al. |
| 5,762,789 A * | 6/1998 | de los Reyes et al. .. 210/321.75 |
| 5,779,903 A | 7/1998 | Smith et al. |
| 5,782,791 A | 7/1998 | Peterson et al. |
| 5,813,245 A | 9/1998 | Coates et al. |
| 5,816,621 A | 10/1998 | Frost |
| 5,824,217 A | 10/1998 | Pearl et al. |
| 5,842,724 A | 12/1998 | Kozinski et al. |
| 5,842,888 A | 12/1998 | Belopolsky |
| 5,858,224 A | 1/1999 | Schwandt et al. |
| 5,911,879 A | 6/1999 | Eybergen |
| 5,922,196 A | 7/1999 | Baumann |
| 5,925,025 A | 7/1999 | Weilbacher et al. |
| 5,925,245 A | 7/1999 | Bradford et al. |
| 5,927,759 A | 7/1999 | Hyslop |
| 5,944,990 A | 8/1999 | Edens |
| 5,951,862 A | 9/1999 | Bradford |
| 5,984,371 A | 11/1999 | Mailleux |
| 6,024,229 A | 2/2000 | Ayers |
| D423,081 S | 4/2000 | Niermeyer |
| 6,048,454 A | 4/2000 | Jenkins |
| 6,059,318 A | 5/2000 | Estep et al. |
| 6,059,797 A | 5/2000 | Mears |
| 6,068,770 A * | 5/2000 | Niermeyer et al. ....... 210/321.6 |
| 6,139,738 A | 10/2000 | Maxwell |
| 6,142,170 A * | 11/2000 | Belfer et al. ................. 137/240 |
| 6,159,366 A | 12/2000 | Carroll |
| 6,176,904 B1 | 1/2001 | Gupta |
| 6,251,270 B1 | 6/2001 | Blot-Carretero et al. |
| 6,290,523 B1 | 9/2001 | Barnhart et al. |
| 6,348,149 B1 | 2/2002 | Jenkins |
| 6,378,907 B1 * | 4/2002 | Campbell et al. ............. 285/26 |
| 6,387,271 B1 | 5/2002 | Geibel et al. |
| 6,517,717 B1 | 2/2003 | Hakansson |
| 6,523,861 B1 | 2/2003 | Clancy et al. |
| 6,533,933 B1 | 3/2003 | Stankowski et al. |
| 6,547,284 B2 | 4/2003 | Rose et al. |
| 6,581,974 B1 | 6/2003 | Ragner et al. |
| 6,634,509 B2 | 10/2003 | Ochi |
| 6,635,119 B1 * | 10/2003 | Tunney et al. ................ 134/19 |
| 6,715,643 B1 * | 4/2004 | Kelly ........................... 222/82 |
| 6,733,250 B2 | 5/2004 | Yajima |
| 6,752,159 B1 * | 6/2004 | Kavadeles et al. ....... 134/22.12 |
| 6,840,548 B2 | 1/2005 | Lacroix |
| 6,902,671 B2 | 6/2005 | Cappia et al. |
| 7,021,667 B2 | 4/2006 | Campbell et al. |
| 7,029,238 B1 * | 4/2006 | Zagars et al. ................. 417/26 |
| 7,037,424 B2 | 5/2006 | Niermeyer et al. |
| 7,163,037 B2 * | 1/2007 | Walkowski ................. 141/350 |
| 7,195,122 B2 | 3/2007 | Hiranaga et al. |
| 2002/0060189 A1 | 5/2002 | Conrad |
| 2002/0079695 A1 | 6/2002 | Campbell et al. |
| 2002/0163187 A1 | 11/2002 | Pelfrey et al. |
| 2004/0070201 A1 | 4/2004 | Niermeyer et al. |

FOREIGN PATENT DOCUMENTS

| | | |
|---|---|---|
| DE | 3100564 | 12/1982 |
| DE | 35 21 536 C1 | 2/1987 |
| DE | 29618092 | 12/1996 |
| DE | 197 17 054 A 1 | 11/1998 |
| EP | 0 231 862 A2 | 8/1987 |
| EP | 0 269 054 A2 | 6/1988 |
| EP | 0390 715 A1 | 10/1990 |
| EP | 0 408 375 A2 | 1/1991 |
| EP | 0 492 627 A2 | 7/1992 |
| EP | 0 492 627 A3 | 7/1992 |
| EP | 0 535 546 A1 | 4/1993 |
| EP | 0 231 862 B1 | 5/1994 |
| EP | 0 616 826 A1 | 9/1994 |
| EP | 0 492 627 B1 | 6/1996 |
| EP | 0 815 928 A2 | 1/1998 |
| EP | 0 818 228 A1 | 1/1998 |
| EP | 0 887 100 A1 | 12/1998 |
| EP | 1 057 493 A2 | 12/2000 |
| FR | 2 310 501 | 12/1976 |
| FR | 2 633 368 A1 | 12/1989 |
| FR | 2 745 043 A1 | 8/1997 |
| GB | 344502 A | 12/1929 |
| GB | 1 391 486 | 4/1975 |
| GB | 2 137 110 A | 10/1984 |
| GB | 2 314 516 A | 1/1998 |
| JP | 200077588 | 4/1930 |
| JP | 56-122893 A | 2/1980 |
| JP | 57-27588 A | 7/1980 |
| JP | 61-119686 A | 7/1986 |
| JP | 62-234512 A | 10/1987 |
| JP | 2-115008 | 4/1990 |
| JP | 7-17434 A | 1/1991 |
| JP | 3-115092 | 11/1991 |
| JP | 417805 | 2/1992 |
| JP | 4094705 | 3/1992 |
| JP | 52793 | 1/1993 |
| JP | 5-154200 | 6/1993 |
| JP | 5-154201 | 6/1993 |
| JP | 6-106164 A | 4/1994 |
| JP | 6-147383 | 5/1994 |
| JP | H6-39008 | 5/1994 |
| JP | 6042921 | 6/1994 |
| JP | 729003 | 4/1995 |
| JP | 7194905 | 8/1995 |
| JP | 7232015 | 9/1995 |
| JP | 7110323 | 11/1995 |
| JP | 8024856 | 1/1996 |
| JP | 8052465 | 2/1996 |
| JP | 10005746 | 1/1998 |
| JP | 2001-29753 | 2/2001 |
| WO | WO93/16315 A1 | 8/1993 |
| WO | WO 96/33770 | 10/1996 |
| WO | WO 01/02084 | 1/2001 |
| WO | WO 01/64312 A1 | 9/2001 |
| WO | WO 02/22232 A1 | 3/2002 |
| WO | WO 03/022388 A2 | 3/2003 |

OTHER PUBLICATIONS

Memorandum and Order dated Apr. 30, 2004, *Mykrolis Corporation v. Pall Corporation*, United States District Court, District of Massachusetts (Boston) Civil Docket # 1:03-10392-GAO, pp. 1-22.

Clarke, Michael E., "Understanding the Operating Cycles of Mykrolis Two-Stage Technology Photochemical Dispense Systems," Mykrolis Applications Notes, Lit. No. MAL 111, Mar. 1999.

Clarke, Michael E., "Improving Photolithography Equipment OEE with the IMPACT® ST Manifold," Mykrolis Applications Notes, Lit. No. MAL 109, Mar. 1999.

Clarke, Michael E., Cheng, Kwok-Shun, "New Photochemical Filtration Technology for Process Improvement," Paper presented at the INTERFACE '97 Poster Session, San Diego, California, Nov. 10, 1997.

Pall Corporation's Notification of Additional Highly Significant Prior Art Impacting the Validity of the Mykrolis Patents and Request for *Sua Sponte* Dissolution of Preliminary Injunction, *Mykrolis v. Pall Corporation, United States District Court, District of Massachusetts* (Boston) Civil Docket No. 03-10392-GAO, dated Aug. 2, 2004.

Millipore Corporation, "Wafergard™ Photoresist Filtration System," pp. 1-9, (Jun. 1983).

*Mykrolis Corporation v. Pall Corporation, United States District Court, District of Massachusetts (Boston)*, Civil Action No : 03-10392-GAO, Memorandum and Order dated Jan. 12, 2005.

Photograph of Sumitomo Oxygen Concentrator for Medical Treatment Use, MO-2000, Feb. 1993 (along with an English-language translation).

Photographs of MO-2000 Medical Oxygen Generator, as sold beginning in Feb. 1993.

Statement of Kuzukiyo Takano, Oct. 20, 2004 (along with an English-language translation).

Photograph of EZD-3 slotless retrofit manifold (slide-in version), Pall Production No. P011673, Oct. 26, 2004.

Photograph of EZD-3 slotless retrofit manifold (bolt-on version), Pall Production No. P011674, Oct. 26, 2004.

Exhibit 5, Pall's Preliminary Claim Chart Correlating Claim 3 of the '770 Patent to the Sumitomo '200 Publication, Aug. 2, 2004.

Exhibit 6, Pall's Preliminary Claim Chart Correlating Claim 1 of the '907 Patent to the Sumitomo '200 Publication, Aug. 2, 2004.

Exhibit 7, Pall's Preliminary Claim Chart Correlating Claim 3 of the '770 Patent to the Sumitomo '201 Publication, Aug. 2, 2004.

Colder Products Company, St. Paul, Minnesota, "CPC Quick Couplings for Plastic Tubing," Form CP-1, Rev. 2 990; 4 pages, Sep. 1990.

Colder Products Company, St. Paul, Minnesota, "CPC Quick Couplings and Fittings for Plastic Tubing," 3 pages, Sep. 1990.

*Mykrolis Corporation v. Pall Corporation, United States District Court, District of Massachusetts (Boston)* Civil Docket # 1:03-cv-10392-GAO, pp. 1-11, Nov. 17, 2003.

Photoclean EZD, *Filtration of Photoresist, Organic Solvents, Developing Solution and Purified Water*,Pall, 1 page w/translation, Sep. 2, 1999.

Pall'Revised Opposition to Entegris' Motion for Preliminary Injunction, *Entegris, Inc. v. Pall Corporation, United States District Court for the District of Massachusetts*, Civil Action No. 06-10601 GAO, pp. 1-49.

Entegris's Reply Brief in Support of Its Motion for Preliminary Injunction, *Entegris, Inc. v. Pall Corporation, United States District Court for the District of Massachusetts*, Civil Action No. 06-10601 GAO, pp. 1-46.

Affidavit of Michael Clarke in Support for Motion for Preliminary Injunction, *Entegris, Inc. v. Pall Corporation, United States District Court for the District of Massachusetts*, filed Jun. 22, 2006, Civil Action No. 06-10601 GAO.

Supplemental Affidavit of Samir Nayfeh in Support for Motion for Preliminary Injunction, *Entegris, Inc. v. Pall Corporation, United States District Court for the District of Massachusetts*, filed Jun. 22, 2006, Civil Action No. 06-10601 GAO.

Pall'Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Exhibit 13 to Supplemental Declaration of Professor Igor Paul to Pall Corporation's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Exhibit AD to Supplemental Declaration of Professor Igor Paul, Exhibit 13, Part 1 to Pall Corporation's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Exhibit AD to Supplemental Declaration of Professor Igor Paul, Exhibit 13, Part 2 to Pall Corporation's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Letter of Opponent to European Patent 1 096 991, mailed Oct. 2, 2006 in European Opposition to same.

Letter of Opponent to European Patent 1 096 991, mailed Oct. 27, 2006 in European Opposition to same.

"CTG-Klean.™ System" Product Literature, Cuno-Europe, S.A. (Feb. 15, 1990).

"CTG-Klean.198 System I WTS with New Clamp Closure", Product Literature, Cuno Filter Systems, (Jul. 1996).

Millipore Corporation, "IntelliGen Dispense System with Impact LHVD Filter" (undated; at least as early as Nov. 2000).

Millipore Corporation, "IntelliGen Dispense System with Impact LHVD Filter" (Nov. 2000).

Millipore Corporation Web Pages, "IntelliGen Dispense System"(Feb. 6, 2001).

Mykrolis Corporation Manual, "IntelliGen 2 System Drawer Dispense Systems with Impact LHVD Filter," P90034, (Aug. 2002).

Mykrolis Corporation, "Impact2 Manifold," (Sep. 2002).

Pall Corporation, "Filter assembly," Solid State Technology, p. 68, ME000610, (Dec. 2001).

Mykrolis Coporation, "Photochemical Dispense System Selection Guide," Rev. A, 5 (Mar. 2003).

Mykrolis Coporation, "Encompass™ HV Fluid Dispense System," (Sep. 2001).

Mykrolis Coporation, "IntelliGen 2 Dispense System with Digital Valve Control (DVC)," Rev. C, 21 (Sep. 2004).

Pall's Revised Opposition to Entegris' Motion for Preliminary Injunction, *Entegris, Inc. v. Pall Corporation, United States District Court for the District of Massachusetts*, Civil Action No. 06-10601 GAO, pp. 1-49, Jun. 16, 2006.

Entegris's Reply Brief in Support of Its Motion for Preliminary Injunction, *Entegris, Inc. v. Pall Corporation, United States District Court for the District of Massachusetts*, Civil Action No. 06-10601 GAO, pp. 1-46, Jun. 16, 2006.

Pall's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Exhibit AE to Supplemental Daclaration of Professor Igor Paul, Exhibit 13 to Pall Corporation's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Exhibit AF to Supplemental Declaration of Professor Igor Paul, Exhibit 13 to Pall Corporation's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Supplemental Declaration of Stephen A. Geibel, Exhibit 14 to Pall Corporation's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Exhibit I to Supplemental Declaration of Stephen A. Geibel, Exhibit 14 to Pall Corporation's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Exhibit J to Supplemental Declaration of Stephen A. Geibel, Exhibit 14 to Pall Corporation's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Exhibit K to Supplemental Declaration of Stephen A. Geibel, Exhibit 14 to Pall Corporation's Sur-Reply in Opposition to Entegris' Motion for Preliminary Injunction, *Entegris, Inc. v. Pall Corporation, United States District Court for the District of Massachusetts*, filed Jul. 7, 2006, Civil Action No. 06-10601 GAO.

Exhibit L to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Exhibit M to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Excerpts from Entegris Appeal Brief, Exhibit 15 to Pall Corporation's Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Family Tree of the '667 Patent, Exhibit 16 to Pall Corporation'Sur-Reply in Opposition to Entegris' Motion for Preliminary Injunction, *Entegris, Inc.* v. *Pall Corporation, United States District Court for the District of Massachusetts*, filed Jul. 7, 2006, Civil Action No. 06-10601 GAO.

Entegris, Inc.'s Response to Pall Corporation's Sur-Reply, *Entegris, Inc.* v. *Pall Corporation, United States District Court for the District of Massachusetts*, filed Jul. 14, 2006, Civil Action No. 06-10601 GAO, pp. 1-8.

Second Supplemental Affidavit of Samir Nayfeh in Support for Motion for Preliminary Injunction, *Entegris, Inc.* v. *Pall Corporation, United States District Court for the District of Massachusetts*, filed Jul. 14, 2006, Civil Action No. 06-10601 GAO, pp. 1-4.

Supplemental Affidavit of Michael Clarke in Support for Motion for Preliminary Injunction, *Entegris, Inc.* v. *Pall Corporation, United States District Court for the District of Massachusetts*, filed Jul. 14, 2006, Civil Action No. 06-10601 GAO, pp. 1-7.

Weber, K., "Inbetriebnahme verfahrenstechnischer Anlagen", pp. 190-213, 1996.

Pall's Opposition to Entegris' Motion for Preliminary Injunction, *Entegris, Inc.* v. *Pall Corporation, United States District Court for the District of Massachusetts*, Civil Action No. 06-10601 GAO, pp. 1-52.

Declaration of Professor Igor Paul, pp. 1-29, Exhibit 5 to Pall Corporation's Opposition to Entegris' Motion for Preliminary Injunction filed Jun. 1, 2006, Civil Action No. 06-10601 GAO.

Exhibit G, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit R, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit S, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit T, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit U, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit V, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit W, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit X, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit Y, to Declaration of Professor Igor Paul, Exhibit 5 to Pall Corporation's Opposition to Entegris' Motion for Preliminary Injunction filed Jun. 1, 2006, Civil Action No. 06-10601 GAO.

Declaration of Stephen Geibel, Exhibit 6 to Pall Corporation's Opposition to Entegris' Motion for Preliminary Injunction filed Jun. 1, 2006, Civil Action No. 06-10601 GAO.

Exhibit F, to Declaration of Stephen Geibel, Exhibit 6 to Pall Corporation's Opposition to Entegris' Motion for Preliminary Injunction filed Jun. 1, 2006, Civil Action No. 06-10601 GAO.

Exhibit G, to Declaration of Stephen Geibel, Exhibit 6 to Pall Corporation's Opposition to Entegris' Motion for Preliminary Injunction filed Jun. 1, 2006, Civil Action No. 06-10601 GAO.

Declaration of Michael Mesawich, Exhibit 7 to Pall Corporation's Opposition to Entegris' Motion for Preliminary Injunction filed Jun. 1, 2006, Civil Action No. 06-10601 GAO.

Exhibit A, to Declaration of Michael Mesawich, Exhibit 7 to Pall Corporation's Opposition to Entegris' Motion for Preliminary Injunction filed Jun. 1, 2006, Civil Action No. 06-10601 GAO.

Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit B, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit C, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit D, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit E, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit F, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit G, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit H, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit I, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit J, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit K, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit L, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit M, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit N, to Declaration of Dan Jenkins, Exhibit 8 to Pall Corporation's Opposition to Entegris' Motion for Preliminary Injunction filed Jun. 1, 2006, Civil Action No. 06-10601 GAO.

Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit B, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit C, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit D, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit E, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit F, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit G, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit 5, Pall's Preliminary Claim Chart Correlating Claim 3 of the '770 Patent to the Sumitomo '200 Publication, Aug. 2, 2004.

Exhibit 6, Pall's Preliminary Claim Chart Correlating Claim 1 of the '907 Patent to the Sumitomo '200 Publication, Aug. 2, 2004.

Exhibit 7, Pall's Preliminary Claim Chart Correlating Claim 3 of the '770 Patent to the Sumitomo '201 Publication, Aug. 2, 2004.

*Mykrolis Corporation* v. *Pall Corporation, United States District Court, District of Massachusetts* (*Boston*) Civil Docket # 1:03-cv-10392-GAO, pp. 1-11, Nov. 2003.

Photoclean EZD, *Filtration of Photoresist, Organic Solvents, Developing Solution and Purified Water*,PALL, 1 page w/translation, Sep. 2, 1999.

* cited by examiner

METHOD AND SYSTEM FOR PURGING A DISPENSED FLUID WITHIN A FLUID DISPENSING SYSTEM INCLUDING A FILTER-FREE CONNECTOR APPARATUS

REFERENCE TO RELATED APPLICATION

This application is a divisional application Ser. No. 09/113,837, filed on Jul. 10, 1998 now U.S. Pat. No. 6,378,907, which is a continuation of in part of 08/678,795, filed Jul. 12, 1996 now U.S. Pat No. 6,068,770

BACKGROUND OF THE INVENTION

This invention relates to a connector apparatus for connecting elements of a fluid transfer system and to the system including the connector apparatus. Fluid separation devices having an easily replaceable and disposable fluid separation module have been used to control contamination in industrial processes for many years. Such devices are an integral part of the manufacture of many products including pharmaceuticals, food stuffs and beverages. However, nowhere is the need for effective contamination control greater than in the semiconductor fabrication industry. With circuit details in the submicron range and with further feature size reductions inevitable, the need for control of particulate, ionic, organic and other contaminants in semiconductor process fluids is essential. Also, because semiconductor devices are fabricated in clean rooms, it is important to minimize the potential of contaminating the manufacturing environment. For this reason, disposable fluid separation devices are preferable in semiconductor fabrication processes in order to minimize contamination of the process lines as well as the clean room.

Examples of semiconductor process fluids which are processed at the point of use (POU) include those chemicals used in photolithographic processing (photochemicals). Photochemicals include materials such as primers, adhesion promoters, photoresists, edge bead removers, antireflective coatings, developers, dielectrics, and the like. Such chemicals are commonly dispensed onto the silicon wafer by a specialized pump and subsequently dispersed into a uniform thin film using a process called spin coating. The purity of these chemicals at the POU is essential to producing acceptable product yields.

Fluid separation devices are in general of two types. In the first type, the separation element that includes a filter is a replaceable component, while the pressure vessel which houses the element, i.e., the housing, is reusable. The housing also contains appropriate fluid connections to the rest of the fluid processing system. Replacing the fluid separation element requires opening the housing, removing the separation element, installing the replacement separation element into the housing and closing the housing. There are many disadvantages to this type of fluid separation device. First, the replacement operation is time consuming, especially if access to the housing is restricted. Secondly, because the housing contains a quantity of the fluid being processed and because the fluid separation element is usually saturated with the fluid, spillage of the fluid usually occurs. In the case of hazardous fluids, spills can be a threat to the well-being of personnel in the area as well as potentially damaging to nearby equipment and facilities. Finally, the opening of the housing exposes the internal surfaces of the fluid processing system to unwanted contamination from the surrounding environment.

The second type of separation device is one in which the separation element is permanently attached to the housing, which also contains appropriate fluid connections to the rest of the fluid processing system, to form an integrated module. In this case, replacement involves disconnecting the entire separation module from the fluid processing system and reconnecting a replacement module to the system. In this manner replacement is easier, exposure of the operator to hazardous chemicals is minimized, the reliability of the connection is significantly improved, and contamination of the fluid processing system by the environment is reduced. The type of separation device is referred to as a disposable module, since the whole module is removed and disposed of whenever the separation element requires replacement regardless of what connector design is employed. Disposable modules usually require that multiple connections be made sequentially, a minimum of two connections, and more typically three or four. Threaded fasteners are cumbersome and sometimes difficult to engage; factors which involve the subsequent consumption of additional time and effort. Furthermore, the module has to be held in place while the connections are being made, which makes the connection event even more difficult since it requires performing two actions at the same time (i.e., holding the module in place and attaching each connector sequentially). Finally, in those applications in which the permanent connections to the fluid processing system are not rigid, as for example, when flexible tubing is used, liquid has a tendency to be discharged as the connections disengage. All of these problems exacerbate the time and effort required to replace a disposable module, in addition to still allowing for exposure of personnel to hazardous materials, and contamination of the manufacturing environment.

For these reasons, some disposable separation modules have been designed with features that allow them to be connected quickly and easily to the fluid processing system in a "quick-connect" fashion. These types of quick-connect modules provide for a set of connectors that sealingly engage with a single, simple stroke or action, to a mating set of connectors attached to a reusable substrate. Different types of mechanisms have been designed to accomplish quick-connect retention, all of which heretofore have required some form of relative motion between the male connector and its female counterpart, most commonly a twisting action.

Periodically, the fluid delivery systems utilizing a disposable separation module must be flushed of the liquid composition being delivered in order to prepare the system for delivery of another liquid composition. Since the separation module contains retentate from the initially processed liquid composition, it must be replaced during the flushing procedure. Also, because a separation module is an integral part of the fluid delivery system, one must be included in the system during flushing. The separation module utilized during the flushing procedure must be replaced after flushing since it contains retentate from the initial liquid composition removed from the system during the flushing step. This procedure is undesirable since the separation module is expensive.

Accordingly, it would be desirable to provide a means for flushing a liquid delivery system of processed liquid which does not require a separation module. In addition, it would be desirable to provide such a means which permits addition of a separation module to the system without otherwise changing the system.

SUMMARY OF THE INVENTION

The present invention provides a connector apparatus which can be substituted for a separation module in a system for dispensing a filtered fluid composition. The connector apparatus includes fluid inlet means configured in the same pattern as the fluid inlet means and fluid outlet means of the separation module. The connector apparatus is nonworking in that it performs no function other than transferring fluid therethrough.

The present invention also provides a system for purging a fluid from a fluid dispensing system which includes a feed pump, a dispensing pump and the connector apparatus of this invention.

DESCRIPTION OF SPECIFIC EMBODIMENTS

Figure 1:
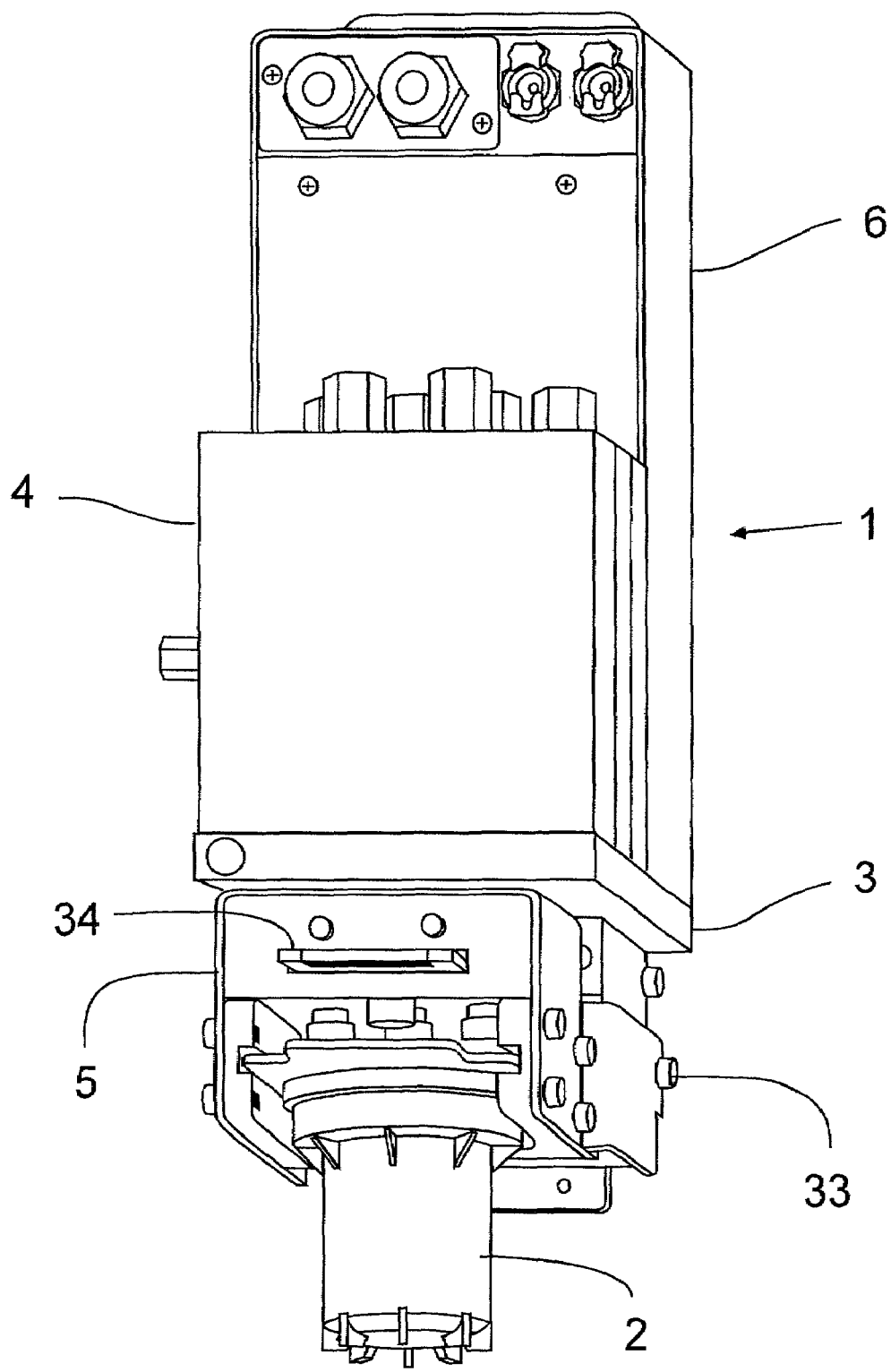
FIG. 1 is a perspective view of a fluid dispensing apparatus which includes a separation module.

This connector apparatus of this invention is useful for purging a fluid from a fluid dispensing system which includes a pump. The fluid dispensing system can include a single pump or a plurality of pumps such as a two pump system comprising a dispensing pump and a feed pump. Such a system, when dispensing a fluid includes a separation module having a separation element which separates unwanted components of the fluid from the fluid composition being dispensed. The connector apparatus of this invention replaces a separation module having a filter means by disconnecting the separation module from fluid inlet means and fluid outlet means of the module from conduits in the system which connect to the inlet means and the outlet means. The connector apparatus of this invention has the same configuration of inlets and outlets on its outer surface as on the outer surface of the separation module it replaces so that it is compatible with the remainder of the fluid dispensing system.

The present invention will be particularly described herein with reference to a two pump fluid dispensing system including a feed pump, a dispensing pump and a separation module having a particular configuration of inlet means and outlet means. However, it is to be understood that the present invention can be utilized in a fluid dispensing system having a separation module regardless of the outer surface configuration of inlet means and outlet means on the surface of the separation module. For example, the connector apparatus of this invention can be utilized to replace a filtration module including a filter and a filter housing as disclosed in U.S. Pat. Nos. 5,167,837 and 5,516,429 which are incorporated herein by reference. In addition, it is to be understood that the connector apparatus of this invention also is useful in a fluid dispensing system utilizing a single pump or more than two pumps.

The connector apparatus of this invention provides the substantial advantages of avoiding the need for a separation module including a separation element, when purging a fluid dispensing system. In addition, the volume capacity of the connector apparatus can be minimized to the volume needed to transport fluid therethrough so that the purge fluid needed for the system can be substantially less than the interior volume of the separation module.

An example of the application of this invention is in the point of use (POU) purification of photochemicals used in the microelectronics manufacturing industry. Photochemical dispense pumps and POU fluid separation devices are typically found in a drawer mounted beneath the spin coating apparatus. There are sometimes as many as eight pumps per drawer, severely limiting access to POU fluid separation devices which may be close-coupled to the dispense pumps to eliminate extraneous external plumbing and potential fluid contamination. Particularly suitable dispense pump and separation devices are those in which the pump and separation device form an integrated system as disclosed in U.S. Pat. No. 5,262,068 whose disclosure is incorporated by reference. User-friendly separation modules capable of being connected in a quick-connect fashion would be preferable in this application.

Figure 2:
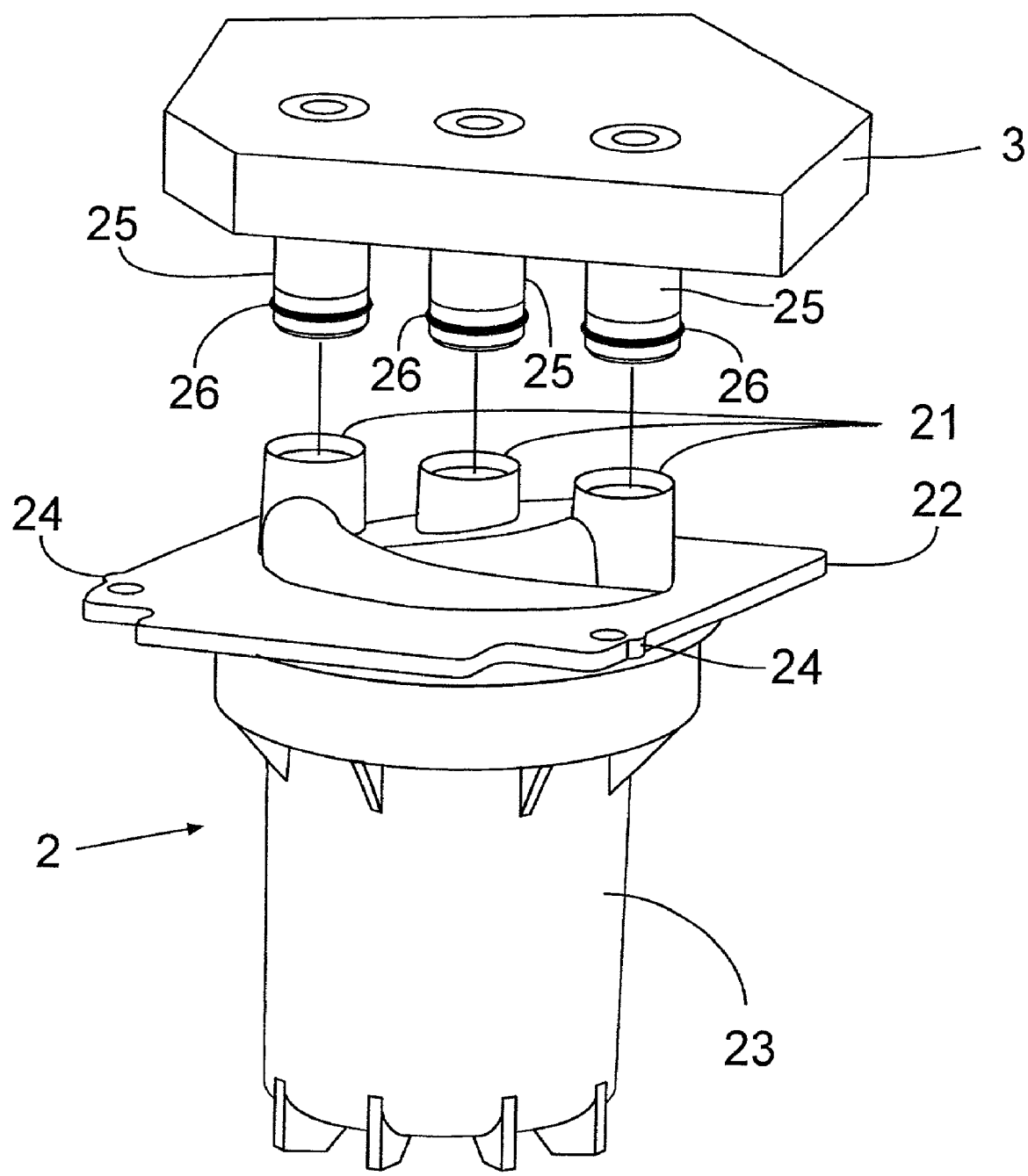
FIG. 2 is a perspective view of a manifold and separation module of the apparatus of FIG. 1.
Figure 5:
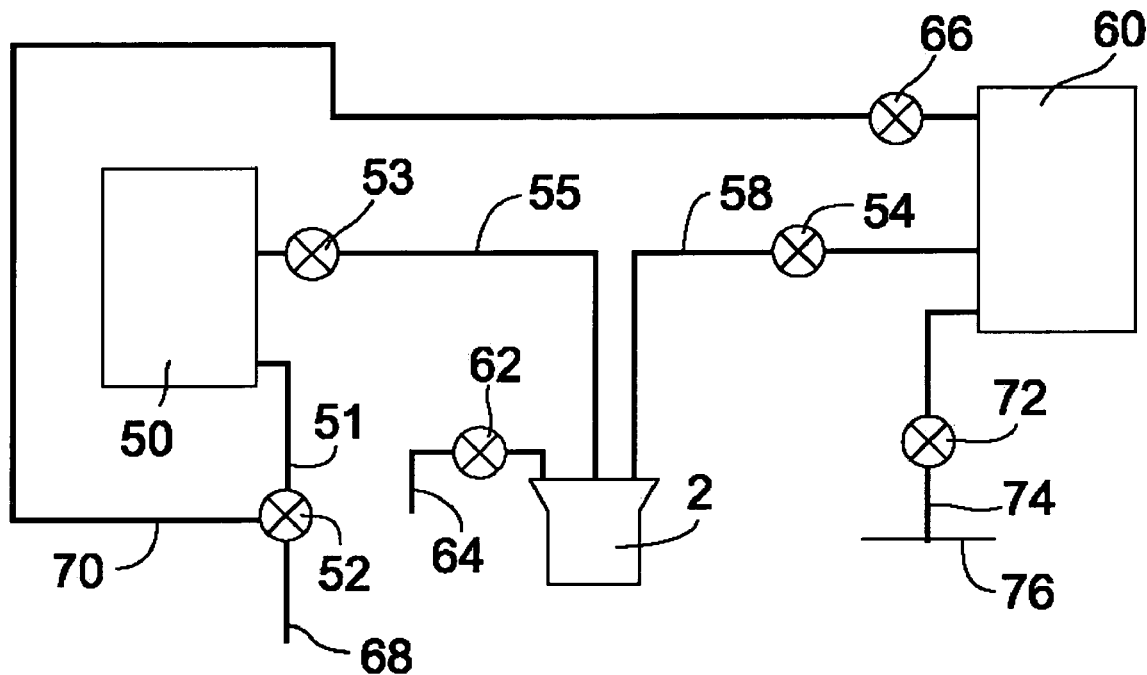
FIG. 5 illustrates a system for dispensing a filtered fluid which utilizes the connector apparatus of this invention.

A fluid dispensing apparatus useful with the connector apparatus of the present invention is shown in FIGS. 1, 2 and 3. FIG. 1 shows a perspective view of photochemical dispense system 1, which includes disposable separation module 2, manifold block 3, pump means housing 4 and module receptor 5. The pump means housing 4 contains a feed pump and a dispensing pump (FIG. 5). Also shown is pump controller 6 which controls the electronic and pneumatic signals directed to and from the pump. The dispense system is similar in design and operation to that disclosed in U.S. Pat. No. 5,262,069. The manifold block 3, which is attached to pump 4, is reusable and designed to matingly accept and retain module 2 as will be described in more detail below.

FIG. 2 is a perspective view of disposable module 2 and a partially sectioned view of the lower portion of manifold 3, showing details of the feature that make module 2 capable of connecting to manifold block 3 in a quick-connect fashion. Module 2 has three female fluid connectors 21 on the top end of the module and in fluid communication with the separation element (not shown) within housing 23. The separation element may be of the flat sheet membrane type as described in U.S. Patent No. 5,262,068, or more preferably may be comprised of hollow fiber membranes of the type described in commonly assigned U.S. Patent No. 5,762,789, which is incorporated herein by reference. The connectors 21 are spaced apart, parallel and exclusive to each other, so as to enable them to sealingly engage in quick-connect fashion to mating male connectors 25 on manifold block 3. Male connectors 25 are tubular extensions of the fluid passageways of pump 4, and are disposed on the lowermost portion of pump 4. Fluid tight sealing of the mating connector pairs 21 and 25 is accomplished by means of O-rings 26 attached to each of male connectors 25. Flange 22, attached to housing 23, positions the entire module 2 and further provides the module's alignment to manifold block 3 in conjunction with module receptor 5, and as such, assists in the retention of module 2 in sealing engagement to manifold block 3. In this particular embodiment flange 22 includes projections 24 to aid in precisely locating module 2 within the module receptor 5 which is designed to accept the disposable module. The size, shape and location of connectors 21 and flange 22 on module 2 are such as to make module 2 capable of being connected into manifold block 3 in a quick-connect fashion in conjunction with module receptor 5. One of the connectors 21 comprises a fluid inlet to the housing 23. A second connector 21 comprises a fluid outlet from the housing 23. A third connector 21 comprises a vent for removing gas from the housing 23. When venting of gas is not a requirement, a valve or the like in a conduit in fluid communication with the vent connector can be utilized to close fluid flow through the vent connector.

Figure 3A:
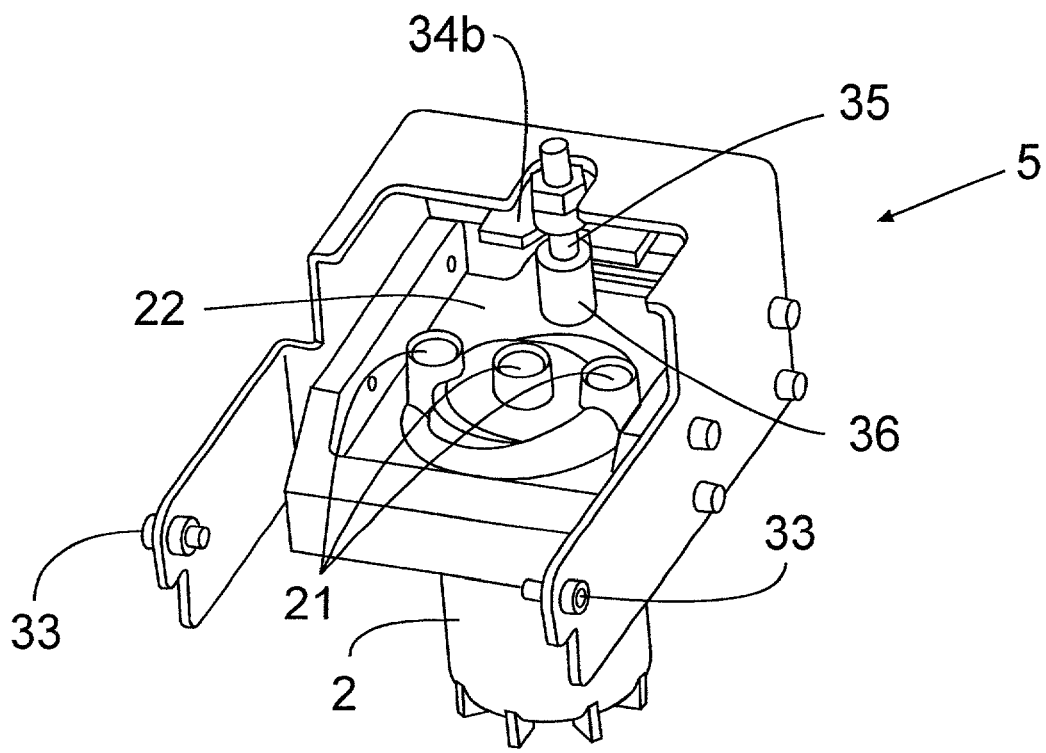
FIGS. 3a and 3b are perspective views of the module of FIG. 2 showing the connections of the separation module with a module receptor.
Figure 3B:
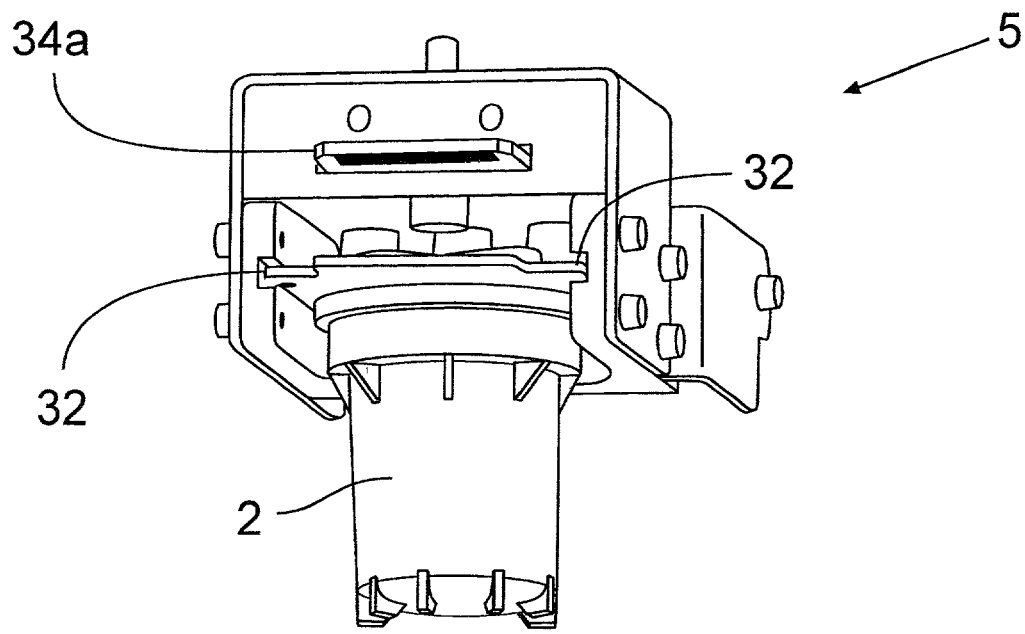

FIGS. 3a and 3b are perspective views of module receptor 5 (shown removed from the pump 4 in these views), which is attached to manifold block 3 showing module 2 positioned within receptor 5. The flange 22 mates with a pair of slots 32 in the body of receptor. The module receptor is attached to the manifold block 3 by hinges 33 which permit a limited range of substantially linear vertical movement which enables the disposable module 2 to be sealingly engaged with, and alternatively disengaged from the male connectors 25 on the manifold block. The module receptor is further attached to the pump 4 by a spring-loaded latch 34, one end of which forms a handle 34a with the opposite end thereof having a semicircular cutout 34b which interlocks with notch 35 on retainer post 36 which is affixed to the manifold block. This arrangement retains the module in sealing engagement with the pump after installation. The latch 34 is able to slide horizontally (i.e., in and out of the plane of FIG. 3b) in order to unlock from the notch on the retainer post thereby allowing the receptor 5 to pivot downwardly on hinges 33 for module replacement. When the mating connectors are disengaged, cutout 34b rests under tension against retainer post 36.

The process of replacing disposable filtration module 2 is accomplished by pulling the handle 34a forward, i.e., in a direction that is substantially perpendicular to the direction of motion required for engaging the female connectors 21 to the male connectors 25. This unlocks latch 34 from retainer post 36 and permits the unhinged end of module receptor 5 to be freed from the pump 4, thereby allowing the entire module 2 to pivot downward on hinges 33 a distance sufficient to move connectors 21 on the module out of sealing engagement with mating connectors 25 on manifold block 3. With the module receptor 5 in this lowered position, module 2 may be removed from the dispense system by sliding it out of the slots 32. A replacement filtration module may then be inserted into the slots followed by pivoting module receptor 5 upward to engage connectors 21 into sealing engagement with mating connectors 25 on the manifold block. When replacement module 2 is in sealing engagement with mating connectors 25, cutout 34b automatically locks into notch 35 thereby retaining the filtration module in sealing engagement to the manifold block during fluid processing conditions.

As seen from the foregoing description of the removal and installation of filtration module 2, the engagement and sealing of mating connections 21 and 25 is effected by a first substantially linear motion which is parallel to the axis defining the body of the connectors. The interlocking of the matable elements and consequent retention of the module is then accomplished without relative motion between the mating connectors by a second substantially linear motion which is perpendicular to the first motion corresponding to engagement and sealing of the connectors. Also, it is clear that the present quick-connect arrangement provides simultaneous connection and sealing of all the connectors on the top of the disposable filtration module 2. However, it is apparent that the benefits so derived apply equally even if the module receptor 5 were swung in a greater arc and even if the mating connectors were engaged somewhat sequentially so long as the engagement and retention is effected rapidly and easily enough to be considered a "quick-connect".

Figure 4A:
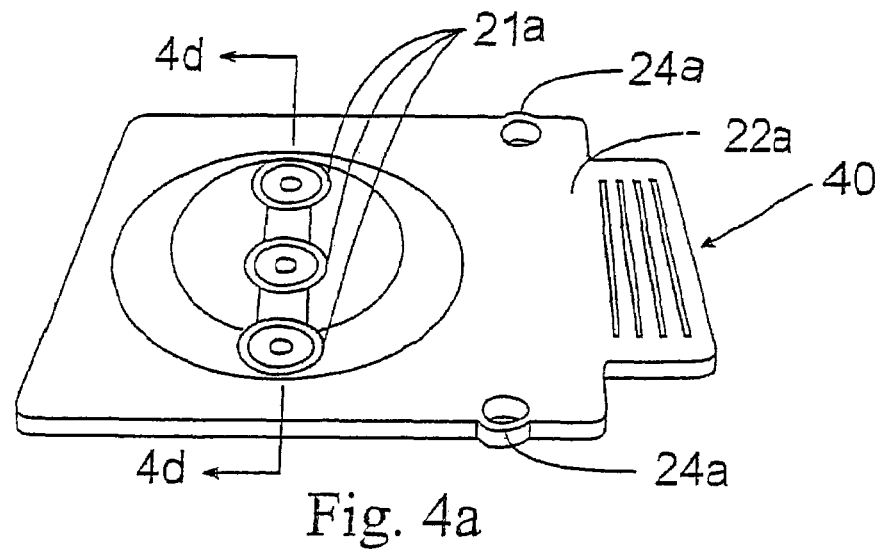
FIGS. 4a, 4b, 4c and 4d show a connector apparatus of this invention.
Figure 4B:
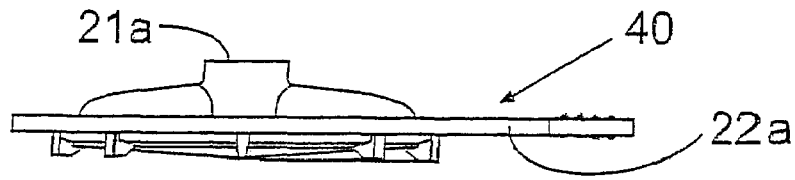
Figure 4C:
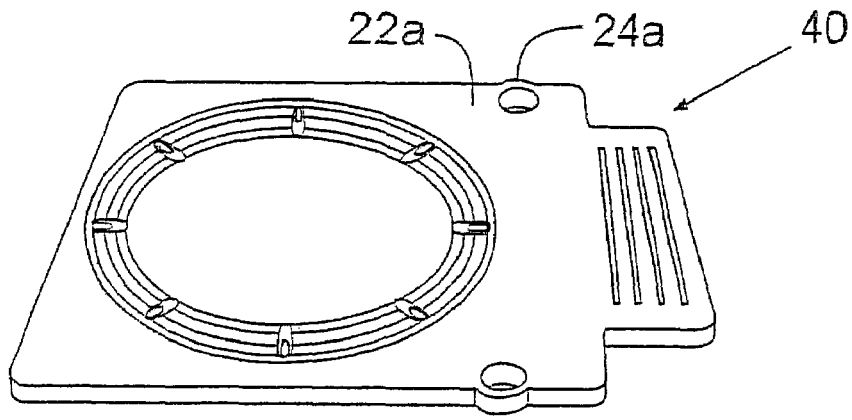

As shown in FIGS. 4a, 4b and 4c, the connector apparatus of this invention 40 includes a flange 22a having the same configuration as flange 22 (FIG. 2) and projections 24a having the same configurations as projections 24. Connectors 21a have the same configuration and spacing as connectors 21 (FIG. 2) and sealingly engage with male connectors 25 as described above with reference to FIG. 2.

Figure 4D:
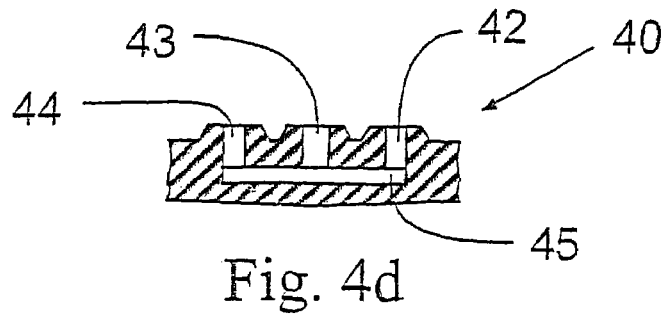

As shown in FIG. 4d, the internal volume of the connector apparatus 42 is significantly less than that of disposable separation module 2. This result is derived from the fact that connector apparatus is a nonworking apparatus and the volume therethrough can be reduced to the volume of conduits 42, 43, 44 and 45.

The operation of the fluid dispensing system including the disposable filtration module 2 will be described with reference to FIG. 5. In a first step, a feed pump 50 draws a liquid into a feed chamber of pump 50 from a storage volume (not shown) through conduit 51 when inlet valve 52 is open. In a second step, isolation valve 53 and barrier valve 54 are open and inlet valve 52 is closed and pump 50 is activated to push liquid through conduit 55 into module 2. Filtered liquid is removed from module 2 through conduit 58 under the influence of pump 50. A dispenser chamber in dispense pump 60 thereby is filled with filtered liquid.

In a third step, barrier valve 54 is closed and vent valve 62 is opened. The feed pump 50 is activated to push a small amount of liquid and any microbubbles therein out of module 2 through conduit 64.

In a fourth step, the barrier valve 54 is closed and the purge valve 66 is opened and dispense pump 60 pushes a small amount of liquid from the dispense chamber in pump 60 and back to the inlet source 68 through conduit 70. This step ensures that the dispense fluid is free of potential microbubbles.

In a fifth step, purge valve 66 is closed and isolate valve 53 is opened and the feed pump 50 and system are allowed to reach ambient pressure. At this point, the system is ready to dispense liquids.

In a sixth step, the outlet valve 72 is opened and the dispenser pump 60 is activated to dispense liquid therefrom through outlet conduit 74 onto wafer 76. In this fluid dispensing process, the feed pump 50 and dispenser pump 60 can be operated independently of each other.

When the dispense system is ready to be purged of the liquid composition being dispensed such as when it is desired to dispense a second liquid composition, module 2 is replaced with connector apparatus 40. The six steps described above for dispensing a liquid then are repeated with a purging liquid in order to purge the entire system of the dispense liquid. It is to be understood that any alternative sequence of steps which assures that purging liquid is passed through the entire system to assure purging of the dispense liquid can be utilized.

After the system is purged, the connector apparatus of this invention is replaced with a fresh module 2 and the above-described dispersing process is repeated to purge the system of the purging fluid and to effect dispensing of a second dispense liquid composition.

Figure 6A:
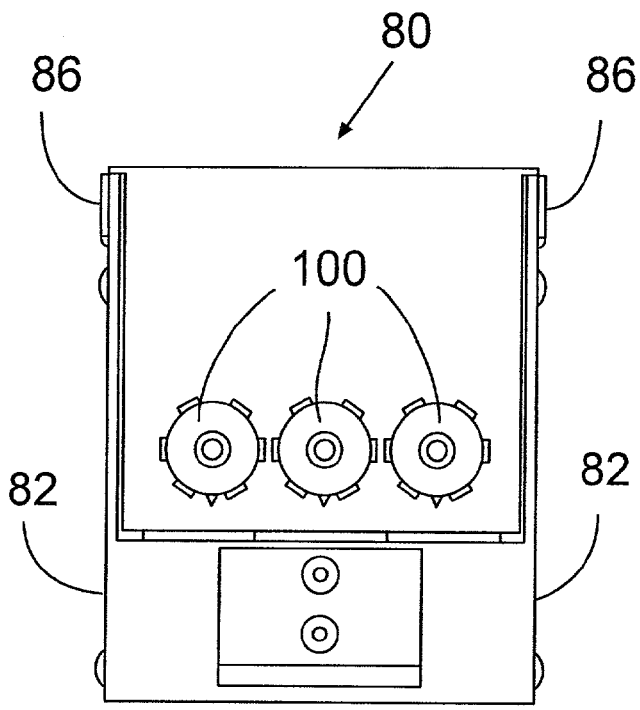
FIGS. 6a, 6b and 6c show a holder for the connector apparatus of this invention.
Figure 6B:
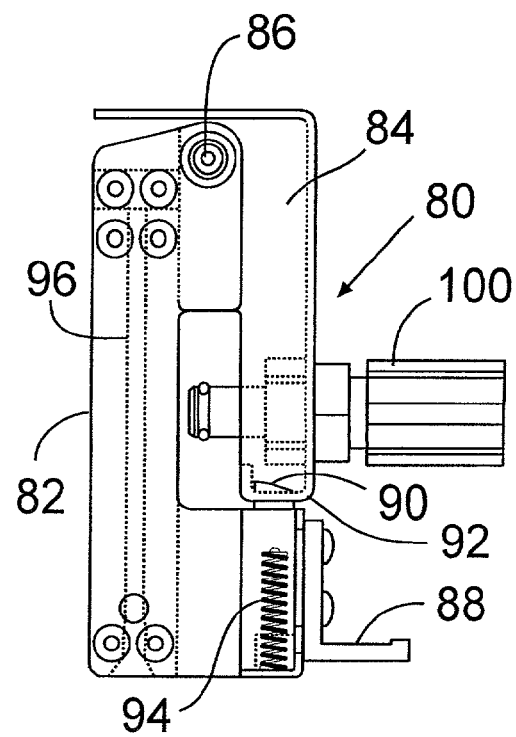
Figure 6C:
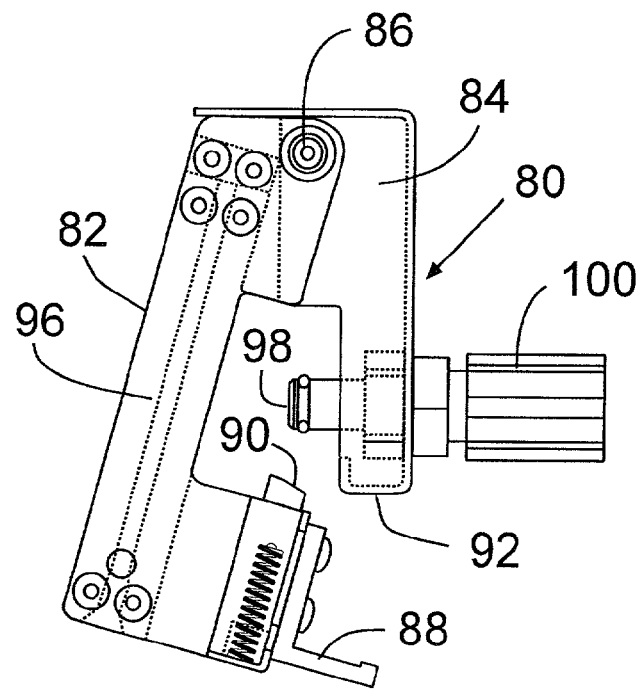

Referring to FIGS. 6a, 6b and 6c, a holder 80 is shown which is configured to secure connector 40 (FIG. 4a) in position to effect fluid communication with a fluid delivery system (not shown). The holder 80 includes two arms 82 pivotally connected to flange 84 at connection 86. The arms 82 are secured in position with respect to the flange 84, as shown in FIG. 6b by spring loaded arm 88 having an arm 90 which is forced into an opening 92 in flange 84 by spring 94.

Release of the arm 90 from the flange 84 is effected by pulling on arm 88 which then permits the arms 82 to be pivoted about connection 86 as shown in FIG. 6c. The connector 40 then is positioned within slots 96 in each arm 82 which accommodates flange 22a (FIG. 4a) so that the connectors 21a are positioned to be sealing fluid communication with the connectors 98 when arm 90 is locked in hole 92. Each connector 98 then can be placed in fluid communication with conduits (not shown) by means of connectors 100.

We claim:

1. A connector apparatus adapted to be interchangeable with a separation module in a fluid dispensing system, the separation module comprising an outer surface comprising a configuration of at least one inlet and at least one outlet that allows the separation module to connect to a fluid connector member of a quick-connect manifold of said fluid dispensing system, the connector apparatus comprising:

a body including a flange to be received in a receiving member of a module receptor of the fluid dispensing system, the module receptor being movably attached to the quick-connect manifold of the fluid dispensing system, an outer surface means of the body having a configuration of at least one inlet and at least one outlet that is substantially similar to the configuration of the at least one inlet and the at least one outlet of the outer surface of the separation module, the at least one inlet and at least one outlet of the connector apparatus being included in a first set of at least three connectors on one end of the outer surface means of the connector apparatus, the first set of at least three connectors being parallel and spaced apart from one another and being exclusive of one another, and the first set of at least three connectors being positioned and sized and shaped to engage in fluid tight engagement with a second set of connectors on the fluid connector member of the quick-connect manifold of the fluid dispensing system, wherein the fluid tight engagement is effected through a first motion which, during said engagement, is substantially linear and parallel to longitudinal axes of both the first and second sets of connectors, the outer surface means of the connector apparatus enabling the connector apparatus to substitute for the separation module by connection to the second set of connectors during a purging process; and the at least one inlet and at least one outlet of said connector apparatus being in fluid communication by an open fluid pathway therein which is free of a filtration means.

2. The connector apparatus of claim 1 wherein said body of the connector apparatus defines an internal volume that is less than an internal volume defined by the separation module.

3. The connector apparatus of claim 1 further comprises at least one projection on the body that is configured to mate with at least one corresponding slot on a module receptor to facilitate alignment of the connectors with corresponding connectors of a fluid connector member.

4. A system for purging a dispensed fluid within a fluid dispensing system, the fluid dispensing system being adapted for use with a separation module comprising a filter and an outer surface comprising a configuration of at least one inlet and at least one outlet that allows the separation module to connect to a fluid connector member of a quick-connect manifold of said fluid dispensing system, the system comprising:

a pump for dispensing fluid from said fluid dispensing system and for introducing fluid into said fluid dispensing system;

a connector apparatus positioned within a module receptor of said fluid dispensing system;

said pump and said connector apparatus being in fluid communication; said connector apparatus comprising an outer surface comprising a configuration of at least one inlet and at least one outlet that is the same as the configuration of the at least one inlet and the at least one outlet of the outer surface of the separation module used in the fluid dispensing system, the at least one inlet and at least one outlet of the connector apparatus being included in a first set of at least three connectors on one end of the outer surface of the connector apparatus, the first set of at least three connectors being parallel and spaced apart from one another and being exclusive of one another, and the first set of at least three connectors being positioned and sized and shaped to engage in fluid tight engagement with a second set of connectors on the fluid connector member of the quick-connect manifold of the fluid dispensing system, wherein the fluid tight engagement is effected through a first motion which, during said engagement, is substantially linear and parallel to longitudinal axes of both the first and second sets of connectors, the outer surface of the connector apparatus enabling the connector apparatus to substitute in said fluid dispensing system for the separation module by connection to the second set of connectors; and the at least one inlet and at least one outlet of said connector apparatus being in fluid communication by an open fluid pathway therein that is free of a filter.

5. A system for purging a dispensed fluid within a fluid dispensing system, the fluid dispensing system being adapted for use with a separation module comprising a separation element, the separation module comprising an outer surface comprising a configuration of at least one inlet and at least one outlet that allows the separation module to connect to a fluid connector member of a quick-connect manifold of said fluid dispensing system, the system comprising:

a dispenser pump for dispensing fluid from said fluid dispensing system;

a feed pump for introducing fluid into said fluid dispensing system;

a connector apparatus positioned in a module receptor of said fluid dispensing system and being in fluid communication between said feed pump and said dispenser pump;

said connector apparatus comprising an outer surface comprising a configuration of at least one inlet and at least one outlet that is the same as the configuration of the at least one inlet and the at least one outlet of the outer surface of the separation module used in the fluid dispensing system, resulting in the connector apparatus being interchangeable in said fluid dispensing system with the separation module having the separation element, by fluid tight engagement of the at least one inlet and the at least one outlet of the connector apparatus with the fluid connector member of the quick-connect manifold of the fluid dispensing system; and the at least one inlet and at least one outlet of said connector apparatus being in fluid communication by an open fluid pathway therein that is free of a separation element.

6. The system of claim 5 wherein said connector apparatus includes three connectors to effect fluid communication with said feed pump and said dispenser pump.

7. A connector apparatus adapted for purging a fluid dispensing system of a fluid within said system, comprising:
a body configured to be received in a module receptor of the fluid dispensing system, the body defining an internal volume that is substantially filter-free, an outer surface means of the body having at least one inlet connector and at least one outlet connector that are in fluid communication through the substantially filter-free internal volume, the at least one inlet connector and the at least outlet connector capable of being engaged with a receiving member of a fluid connector member of a quick-connect manifold of the fluid dispensing system in order to enable purging of the fluid dispensing system in a manner free of a separation module, the at least one inlet connector and at least one outlet connector being included in a first set of at least three connectors on one end of the outer surface means, the first set of at least three connectors being parallel and spaced apart from one another and being exclusive of one another, and the first set of at least three connectors being positioned and sized and shaped to engage in fluid tight engagement with a second set of connectors on the fluid connector member of the quick-connect manifold of the fluid dispensing system, wherein the fluid tight engagement is effected through a first motion which, during said engagement, is substantially linear and parallel to longitudinal axes of both the first and second sets of connectors, wherein the outer surface means of the connector apparatus is for enabling the connector apparatus to substitute for the separation module by connection to the second set of connectors during the purging of the fluid dispensing system.

8. The connector apparatus of claim 7 further comprising a flange that is capable of being received in a slot of the receiving member of the fluid dispensing system.

9. The connector apparatus of claim 7 wherein said internal volume of said body of the connector apparatus is less than an internal volume defined by the separation module.

10. A connector apparatus adapted for purging a fluid dispensing system of a fluid within said system, comprising:
a body configured to be received in a module receptor of the fluid dispensing system, the body defining an internal volume that is substantially filter-free, an outer surface of the body having at least one inlet connector, at least one outlet connector, and at least one vent connector that are in fluid communication through the substantially filter-free internal volume; and
the at least one inlet connector, the at least one outlet connector, and the at least one vent connector configured to engage with a receiving member of a quick-connect manifold of the fluid dispensing system in order to enable purging of a fluid dispensing system in a manner free of a separation module.

11. A connector apparatus adapted to be interchangeable with a separation module in a fluid dispensing system, the connector apparatus comprising:
a body configured to be received by a receiving member of a module receptor of the fluid dispensing system, an outer surface of the body having a configuration of at least one inlet and at least one outlet that is substantially similar to a configuration of at least one inlet and at least one outlet of a separation module such that the configuration of the at least one inlet and the at least one outlet allow the connector apparatus to substitute for the separation module during a purging process; and
the at least one inlet and the at least one outlet of said connector apparatus being in fluid communication by an open fluid pathway therein which is free of a filter, and the connector apparatus including at least three connectors including the at least one inlet and the at least one outlet;
wherein the connector apparatus substitutes for the separation module during the purging process by fluid tight engagement of the at least three connectors with a fluid connector member of a quick-connect manifold of the fluid dispensing system.

12. The connector apparatus of claim 11 wherein said body of the connector apparatus defines an internal volume that is less than an internal volume defined by the separation module.

13. The connector apparatus of claim 11 further comprises at least one projection on the body that is configured to mate with at least one corresponding receiving member on a module receptor to facilitate alignment of the connectors with corresponding connectors of a fluid connector member.

14. The connector apparatus of claim 11 wherein the at least three connectors are spaced apart and substantially parallel.

15. A connector apparatus adapted for purging a fluid dispensing system of a fluid within said system, comprising:
a body configured to be received in a module receptor of the fluid dispensing system, the module receptor configured to receive a separation module, the body of the connector apparatus defining an internal volume that is substantially filter-free, an outer surface of the body having at least one inlet connector and at least one outlet connector that are in fluid communication through the substantially filter-free internal volume, the at least one inlet connector and the at least one outlet connector configured to engage with a receiving member of a quick-connect manifold of the fluid dispensing system in order to enable purging of a fluid dispensing system in a manner free of the separation module, the outer surface including at least three connectors including the at least one inlet connector and the at least one outlet connector.

16. The connector apparatus of claim 15 further comprising a flange that is capable of being received in a slot of the receiving member of the fluid dispensing system.

* * * * *